US006429543B1

(12) United States Patent
Desai

(10) Patent No.: US 6,429,543 B1
(45) Date of Patent: Aug. 6, 2002

(54) INNOVATIVE SWITCH FOR REMOTE CONTROL APPLICATIONS

(75) Inventor: Tejas Desai, Sterling Heights, MI (US)

(73) Assignee: Siemens VDO Automotive Corporation, Auburn Hills, MN (US)

( * ) Notice: Subject to any disclaimer, the term of this patent is extended or adjusted under 35 U.S.C. 154(b) by 33 days.

(21) Appl. No.: 09/661,744

(22) Filed: Sep. 14, 2000

Related U.S. Application Data

(60) Provisional application No. 60/157,061, filed on Oct. 1, 1999.

(51) Int. Cl.7 .................................................. B60R 25/00

(52) U.S. Cl. .................... 307/10.1; 307/10.2; 307/10.5; 307/119

(58) Field of Search ...................... 307/10.1, 10.3–10.5, 307/116, 119; 340/825.72, 5.2, 5.3–5.33, 5.52, 5.53, 5.82, 5.83, 573.1; 701/49; 327/517

(56) References Cited

U.S. PATENT DOCUMENTS 4,952,761 A * 8/1990 Viebrantz ................... 200/513
5,869,908 A * 2/1999 Moczygemba et al. .... 307/10.5
6,191,703 B1 * 2/2001 Wallace ................. 340/825.72

* cited by examiner

*Primary Examiner*—Fritz Fleming

(57) ABSTRACT

A key fob for remotely actuating vehicle functions incorporates switches and a control which can determine whether an actuation is inadvertent or intended. In a disclosed embodiment, the switches each include field limited capacitive switches which can determine the amount of surface area of ionic material in proximity to the switch. This allows a placement of switches on both sides of the keyfob without raising the intended danger of inadvertent actuation. If a control determines the switch is proximity to ionic material over its entire surface area, the control can determine that the actuation is inadvertent as it is probably actuation by the palm of a user. However, if the actuation is above a predetermine minimum, yet below a predetermined maximum, the control can identify the actuation as intended.

12 Claims, 1 Drawing Sheet

INNOVATIVE SWITCH FOR REMOTE CONTROL APPLICATIONS

This application claims priority to provisional application 60/157,061, filed on Oct. 1, 1999.

BACKGROUND OF THE INVENTION

This invention relates to a switch for actuating a plurality of vehicle functions remotely wherein the switch can distinguish an inadvertent actuation from an intended actuation.

Vehicle remote signaling devices are becoming widely utilized. Such devices, commonly known as key fobs, incorporate a number of switches for actuating various functions remotely. Examples include door unlock, door lock, trunk unlock, ignition start, etc. There are varying conflicting design criteria for these devices. On the one hand, it is desirable that the devices be small enough to be convenient for carrying. Typically, operators carry these devices in their pocket or purse, and thus it is desirable to keep the devices somewhat small.

On the other hand, as the devices become more popular, it becomes desirable to incorporate more functions into the devices. Each new function has typically required the addition of a further switch. While proposals have been made for utilizing a single switch for a mode control switch such that a single switch can provide various functions, these have not been widely accepted by users.

Thus, at present, there is a trade-off in the design of remote signaling devices with regard to the size and the number of switches which can be incorporated into the devices.

Another problem with these devices is that as more switches are incorporated into the devices inadvertent actuation of a switch becomes a more pronounced problem. These inadvertent actuations can occur when a user accidentally touches a switch when handling the device. As an example, a user carrying the device towards a car may inadvertently actuate the trunk unlock, panic alarm, or some other function which is not desirable.

SUMMARY OF THE INVENTION

In the disclosed embodiment of this invention, a remote signaling device for vehicles is provided with switches which can distinguish between inadvertent and intentional actuations. If an inadvertent actuation occurs, then the function is not actuated. That is, a control senses characteristics of the actuation, and determines whether an intended actuation has occurred. If the control determines that an intended actuation has not occurred, then no actuation will be made. On the other hand, if the characteristics indicate that the actuation is intended, then the function will be actuated.

In one disclosed embodiment of this invention, the switch incorporates a device known as a field limited capacitive switch. Such switch devices are known and utilized in appliance applications. As an example, ovens and ranges are often provided with this type of switch. In this type of switch, the switch senses the proximity of ionic material in a single direction relative to the switch. Typically, the single direction is upward and forward of the switch. If there is ionic material sensed in proximity to the switch then the inventive switch identifies the amount of material in proximity to the switch.

This type of switch provides powerful benefits to a remote signaling device. In particular, the switch senses the amount of ionic material, and provides an indication of the amount to a control. If the control identifies that the amount of ionic material is greater than that which would be indicative of an intended actuation, or if it determines the amount of material is less than that which would be indicative of an intended actuation, then no further step is taken. However, if the amount of material is within a range, then the function is actuated.

The ionic material in this instance will be the hand of a user. The use of this type switch provides additional benefit in that switches can be placed on all sides of the key fob. Thus, the switch can be placed on both the bottom and top of a key fob. Such placement would be undesirable without the ability to distinguish between inadvertent and intended actuation. As an example, switches on the bottom of a key fob might be inadvertently actuated while held in the hand of an operator. With the present invention the switches being held in the palm of a user's hand will identify proximity of ionic material over their entire surface area. The control identifies this as being an inadvertent actuation, and will not actuate any function. As an example, the control can be utilized to only identify an intended actuation if the input is greater than the fifth percentile female finger, and less than a $95^{th}$ percentile male finger. Objects outside this range would not trigger actuation. Further, objects within a purse or pocket would not trigger the key fob, since it is unlikely that any ionic material would be in proximity to the switch at such places.

As one further function, the sensor could also be structured such that the control will identify a small finger, such as a child's, and provide limited access. As an example, the percentile size of an adult's finger relative ot that of a child can be utilized to provide this determination. As an example, a child's finger may be allowed to actuate a door lock function, but would not be allowed to unlock the ignition or start the vehicle.

These and other features of the present invention can be best understood from the following specification and drawings, the following which is a brief description.

DETAILED DESCRIPTION OF A PREFERRED EMBODIMENT

Figure 1:
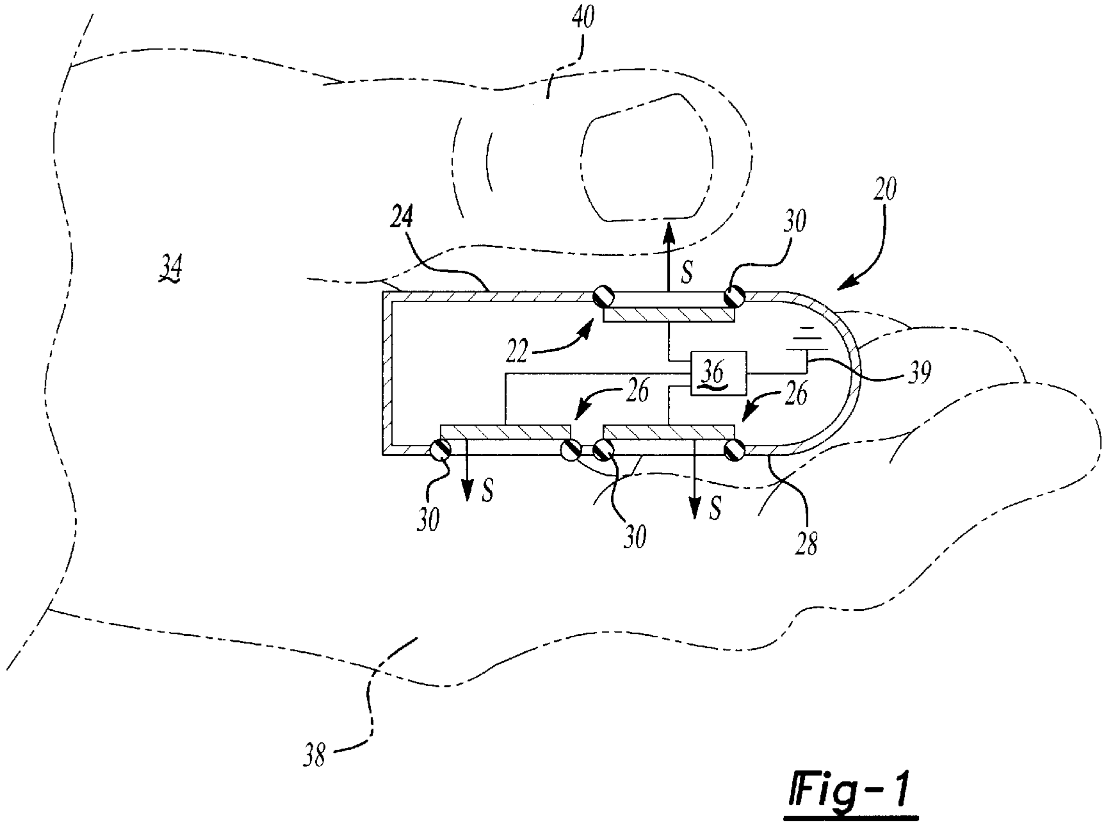
FIG. 1 is a cross-sectional view of an inventive remote signaling device.

As shown in FIG. 1, a remote signaling device 20 incorporates a plurality of switches. One switch 22 is shown on a first face 24 of the device 20, and other switches 26 are shown on an opposed face 28. It should be understood that additional switches could be placed on the sides of the device 20. Each of the switches incorporates structure, such as a seal 30 that directs sensing in the direction shown by the arrow S in FIG. 1. That is, the switches include a member 32 which senses the proximity of ionic material, here the hand 34 of a user. This view is a section through the user's palm.

The type of sensor is preferably that available from Touch Sensor Technologies of Illinois in the United States. Such sensors are known and utilized in oven or range applications to allow a control for the range to distinguish between actuation of several aligned switches placed next to each other.

As shown in FIG. 1, a control 36 receives signals from each of the switches 22 and 26. The switches 26 on the face 28 are adjacent to the palm 38 of the operator's hand 34. With prior art switches, the switches 26 in the palm might have been identified as being actuated when in fact they are not actuated. This has placed a limitation on the placement of switches on two sides of a remote signaling device, such as signaling device 20.

In FIG. 1, the operator's thumb 40 is above the switch 22. This is an intended actuation of the switch 22. As can be appreciated, the palm 38 covers the entire surface area of the sensing part 32, while the thumb is shown contacting only a portion of the surface area of the switch 22. The amount of area for a finger can be defined from a low percentile of small female finger to a higher percentile of male finger, and should include the vast majority of the population. Thus, as an example, a contacted surface area identified by the signaling portion 32 above a fifth percentile female finger and less than a $95^{th}$ percentile male finger, can be identified as an intended actuation. If greater or less contact area is sensed, the control 36 identifies the contact as an inadvertent actuation. As can be appreciated by FIG. 1, the palm 38 covers the entire surface area of the switches 26. These would be identified as inadvertent actuation. At the same time, a finger only lightly touching a portion of one of the switches 32, will also be identified as an inadvertent actuation. It is only when the actuation is over a surface area which is indicative of an intended actuation that the function of the respective switches is actuated. The switches can be for example door lock and unlock (26 and 26, respectively) and trunk unlock (22). The intended functions are known, it is the structure and control of the inventive switches which is inventive here.

As known, the actuation signal is transmitted to the vehicle by a remote connection such as an RF transmitter 39. Other non-hard wired transmitters may be used. A worker in this art will be able to utilize the above and known control technology to provide such a control.

Figure 2:
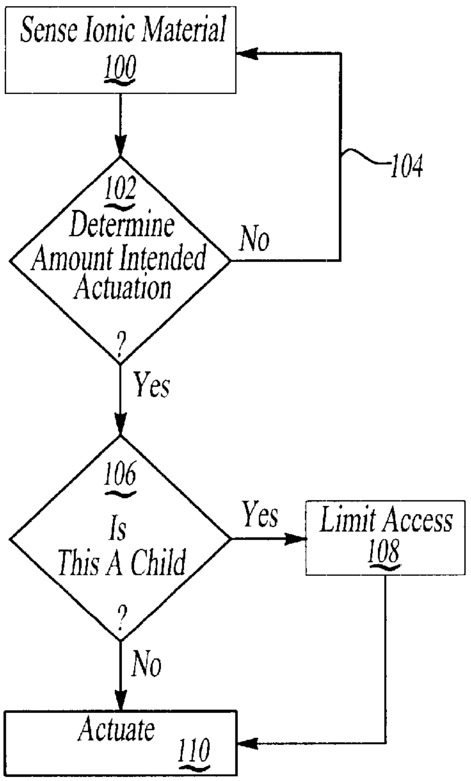
FIG. 2 is a flowchart of the FIG. 1 device.

FIG. 2 shows a flowchart of this invention. The switches sense proximity of ionic material at 100. The amount of ionic material over the surface area of the switch is then identified. A control determines whether that amount is indicative of an intended actuation 102. If not, the control goes back to sensing mode 104. If the percentage does indicate an intended actuation, then the control moves to a second step. In the second step, the control identifies whether the intended actuation is indicative of a child actuating the switch. This is an optional feature, and will provide the ability to limit a child access. This can be used to allow a child to unlock a car, such as to gain access to retrieve an item, but will prevent a child from taking any driving steps with the vehicle. Thus, if actuation is identified as being a child, then there is limited access 108, such as only unlocking doors. If the actuation is not indicative of a child but instead of an adult, then actuation of whatever function has been actuated occurs 110.

It should be understood that the "child limiting" step is optional and need not be part of this invention.

If the actuation is identified as an adult, then the actuation is identified as intended and the appropriate function is actuated.

A preferred embodiment of this invention has been disclosed, however, a worker in this art would recognize that certain modifications come within the scope of this invention. For that reason, the following claims should be determined to study true scope and content of this invention.

What is claimed is:

1. A remote signaling device for actuating functions on a vehicle comprising:

a plurality of switches, each of said switches being manufactured to sense the amount of actuation;

said switches communicating to a control, said control being operable to determine whether an actuation is inadvertent or intended based upon the amount of actuation, and said control being operable to actuate functions on a vehicle through a remote transmitter when an intended actuation has been identified.

2. A device as set forth in claim 1, wherein each of said switches are field limited capacitive switches.

3. A device as set forth in claim 2, wherein each of said switches is operable to determine the surface area of proximite ionic material, and the surface area is utilized by said control whether an actuation is intended or inadvertent.

4. A device as set forth in claim 2, wherein there are switches on each of two opposed sides of said device.

5. A device as set forth in claim 1, wherein said intended actuation is controlling a car door lock.

6. A device as set forth in claim 1, wherein said remote transmitter is an RF transmitter.

7. A signaling device for actuating functions on a vehicle comprising:

a body having two opposed sides; there being switches on each of said two opposed sides.

said switches being configured to identify the amount of actuation by a user; and said switches communicating with a control, said control being operable to determine whether an actuation is intended or inadvertent based upon said amount of actuation.

8. A device as set forth in claim 7, wherein said switches are field limited capacitive switches which are operable to determine the amount of coverage of said switches by an ionic material.

9. A device as set forth in claim 8, wherein said control also determines whether an actuation is by a child and limits the number of functions which can be actuated by the child.

10. A device as set forth in claim 7, wherein said intended actuation is controlling a car door lock.

11. A device as set forth in claim 7, wherein said control sends a signal over a remote transmitter to a vehicle when an intended actuation has been identified.

12. A device as set forth in claim 11, wherein said remote transmitter is an RF transmitter.

* * * * *